United States Patent [19]
Ertel

[11] Patent Number: 5,562,796
[45] Date of Patent: Oct. 8, 1996

[54] HEAT PRESS FOR JOINING THE SPLICED ENDS OF A CONVEYOR BELT

[75] Inventor: Daniel E. Ertel, Oconomowoc, Wis.

[73] Assignee: Dorner Mfg. Corp., Hartland, Wis.

[21] Appl. No.: 248,708

[22] Filed: May 24, 1994

[51] Int. Cl.⁶ ................................................ B30B 15/34
[52] U.S. Cl. ................. 156/498; 156/502; 156/583.1; 156/583.4; 100/93 P; 100/258 A; 100/269.04
[58] Field of Search .................................. 156/580, 581, 156/583.1, 583.3, 583.4, 498, 502; 100/93 P, 295, 258 R, 258 A, 269.04; 425/384, 406

[56] References Cited

U.S. PATENT DOCUMENTS

| | | | |
|---|---|---|---|
| 3,558,390 | 1/1971 | Habegger | 156/137 |
| 3,657,055 | 4/1972 | Nichols | 156/583.4 |
| 3,669,349 | 6/1972 | Hall, Jr. | 236/13 |
| 3,808,968 | 5/1974 | Notin | 100/264 |
| 4,393,766 | 7/1983 | Thies | 100/99 |
| 4,398,991 | 8/1983 | Thies | 156/583 |
| 4,423,674 | 1/1984 | Thies | 100/99 |
| 4,427,107 | 1/1984 | Roberts et al. | 198/844 |
| 4,554,043 | 11/1985 | Fudickar et al. | 156/502 |
| 4,557,791 | 12/1985 | Fudickar et al. | 156/580 |
| 4,609,100 | 9/1986 | Fudickar et al. | 198/584 |
| 4,767,389 | 8/1988 | Habegger et al. | 474/266 |
| 4,790,901 | 12/1988 | Kettelhoit et al. | 156/498 |
| 4,946,541 | 8/1990 | Thies et al. | 156/580 |
| 4,964,943 | 10/1990 | Kruger et al. | 156/498 |
| 5,158,132 | 10/1992 | Guillemot | 165/30 |
| 5,261,997 | 11/1993 | Inselmann | 156/580 |

*Primary Examiner*—James Sells
*Attorney, Agent, or Firm*—Andrus, Sceales, Starke & Sawall

[57] ABSTRACT

An improved heat press for joining the spliced ends of a conveyor belt. The press includes an upper platen containing a flexible, inflatable bladder that is positioned to engage the upper surface of the spliced area of the belt. A lower platen supports the belt and includes an electric heating element that is supported on an aluminum block having a plurality of parallel internal flow channels. A layer of solid insulating material is disposed beneath the lower surface of the block, and along the side edges of the block. The upper platen is clamped to the lower platen and a compressed gas, such as air, is supplied to the bladder to inflate the bladder and urge the belt against the lower platen. Operation of the heating element serves to fuse the spliced ends of the belt. After heating, air is supplied to the channels in the block to cool the press and a venturi mechanism is associated with the air supply, so that a portion of the air being supplied to the press is drawn from the atmosphere.

8 Claims, 5 Drawing Sheets

5,562,796

HEAT PRESS FOR JOINING THE SPLICED ENDS OF A CONVEYOR BELT

BACKGROUND OF THE INVENTION

Endless conveyor belts are commonly formed of urethane and the ends of the belt are joined together by heat and pressure in a heat press to provide an endless configuration. Each end of the belt is initially cut into a series of V-shaped fingers, and the fingers on the two ends of the belt, are then interdigitated or spliced. The spliced joint is then placed in the press, where heat and pressure are applied, causing the urethane to melt and fuse the spliced joint.

The typical heat press used for joining the spliced ends of a conveyor belt includes a lower platen that supports the belt and an upper platen. The belt is clamped between the platens by mechanical clamping members, or alternately, by incorporating an inflatable bladder in the upper platen, and the bladder, when inflated, will force the belt downwardly against the lower platen. Heat is applied to the spliced area by heating elements located in the lower and/or upper platen. In operation, the spliced area of the belt is positioned on the lower platen, and the upper platen is then positioned above the lower platen and clamped to the lower platen. The electrical heating element is then energized to heat and fuse the belt material. After the heating period, the press is cooled either by ambient air cooling or by flowing a cooling medium, such as water or compressed air or a combination of both, through tubes or passages in the lower platen.

The typical heat press as used in the past has several disadvantages. The conventional press has considerable weight so that the press is not portable and thus cannot be used to splice a belt on the conveyor. Instead, the belt must be removed from the conveyor and brought to the site of the heat press. As the conventional heat press has considerable mass, the cycle time for heating and cooling the belt is quite long, generally requiring a cycle time of about one hour for a urethane belt with a thickness of 1/16inch. The excessive mass, as used in the typical heat press, also increases the power requirements for heating and cooling.

In addition, the typical heat press as used in the past has not included automated operation so that an operator's attendance was necessary at all times during the cycle.

If the heat press included water cooling, supply tanks and a recirculation or disposal system were required for the cooling water. On the other hand, if compressed air was utilized for cooling, the exhausting of the high pressure air from the press during the cooling cycle created a noise pollution problem, as well as a potential hazard to employees.

SUMMARY OF THE INVENTION

The invention is directed to an improved heat press for joining the spliced ends of a conveyor belt. The press includes an upper platen and a cooperating lower platen. The upper platen contains a flexible inflatable bladder that when inflated, is positioned to engage the upper surface of the belt, and urge the belt downwardly against the lower platen.

The lower platen, which supports the belt, includes an electric heating element, that is supported on a block or heat sink formed of a metal, such as aluminum, and having a plurality of generally parallel internal flow channels. A layer of insulating material is located beneath the aluminum heat sink, as well as along the side edges of the heat sink.

In operation, the area of the belt to be spliced and containing interdigitated fingers, is positioned on the lower platen, and the upper platen is then clamped to the lower platen. A compressed gas, such as air is supplied to the bladder to inflate the bladder and urge the belt downwardly against the lower platen, and the electrical heating element is energized to thereby heat the belt to a temperature to fuse the plastic material and provide a fused joint.

After heating, compressed air is supplied to the internal flow channels of the aluminum heat sink to cool the lower platen.

As a feature of the invention, a venturi is associated with the air supply system, and the compressed air flowing through the venturi will draw additional air from the atmosphere into the lower platen. Thus, a substantial portion of the cooling air is supplied from the atmosphere, which reduces the volume of compressed air required for cooling.

After flowing through the channels in the aluminum heat sink, the air is discharged from the lower platen through a series of vent openings, which have a substantially larger cross-sectional area than the air supply conduit, so that the air being discharged from the lower platen is at a low pressure.

In order to achieve uniform distribution of the air into the flow channels of the aluminum heat sink, the upper surface of the insulating layer that supports the heat sink is provided with one or more diagonal grooves which intersect the flow channels. The incoming air will flow through the diagonal grooves in the insulating layer and then into the flow channels of the heat sink. This results in a more uniform distribution of air throughout all of the flow channels of the aluminum block.

The heat press of the invention has a reduced mass as compared to conventional heat presses and the heat is completely contained, thus reducing the power requirements to heat the belt to the desired fusing temperature and similarly reducing the volume of cooling medium that is required for cooling.

The press of the invention has a substantially shorter cycle time than conventional heat presses, due to the fact that the press has less thermal mass and more effective heating and cooling.

As the heat press is constructed primarily of aluminum components, and does not include liquid cooling reservoirs, it is relatively light in weight, and is portable so that the press can be utilized to splice a belt directly on the conveyor. This is a particular advantage for long conveyors. To replace a worn belt, it was normally necessary to disassemble the drive and remove the old belt, and then install the new belt and reassemble the drive. As the press of the invention is portable and can be used on the conveyor, the new belt can merely be attached to the old belt, and pulled through the system with the old belt, and then spliced directly on the conveyor itself.

With the use of the press of the invention, the cycle is completely automated, so that unattended operation is achieved.

Other objects and advantages will appear during the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 4:
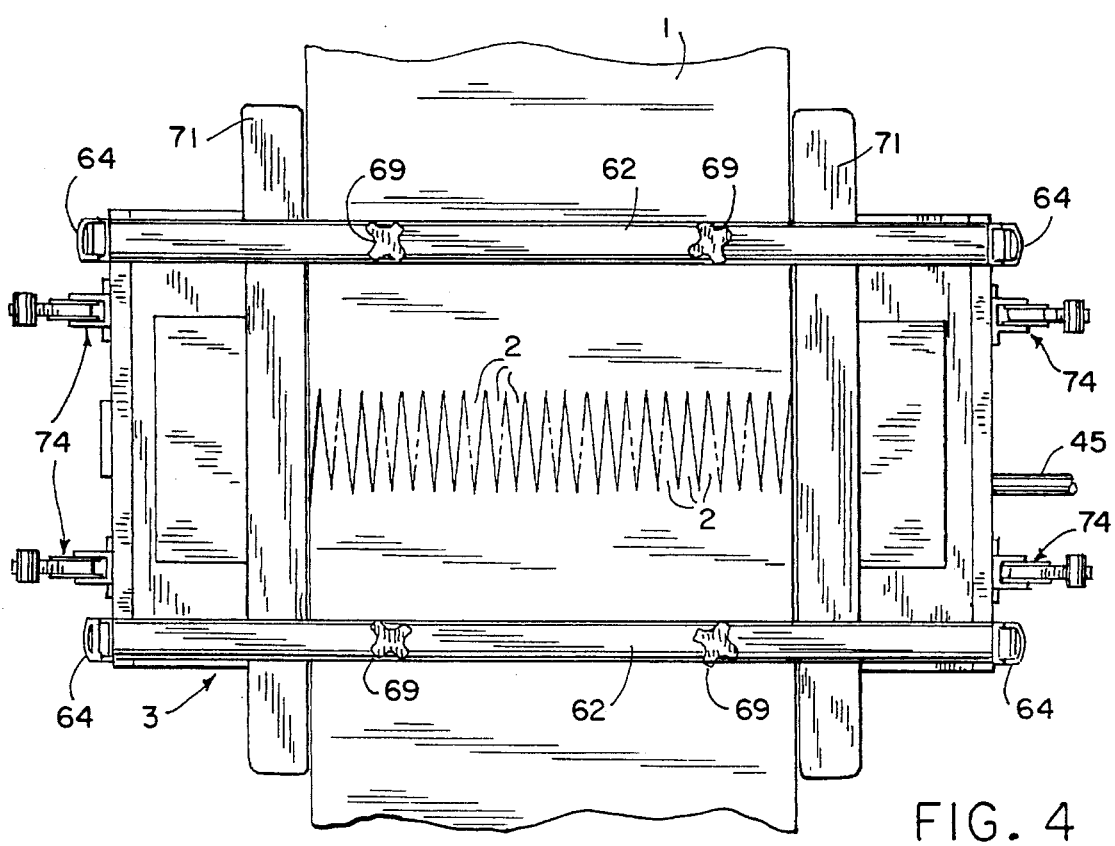
FIG. 4 is a section taken along line 4—4 of FIG. 3.

The invention is directed to a heat or welding press for joining the spliced ends of a conveyor belt 1. As best shown in FIG. 4, the ends of the belt are provided with generally V-shaped fingers 2, which are interdigitated or spliced. The belt is normally formed of a heat fusible material, such as urethane, and through operation of the press of the invention, the material of the belt in the spliced area will melt or fuse, and on cooling a solid joint will be created between the belt ends.

Figure 5:
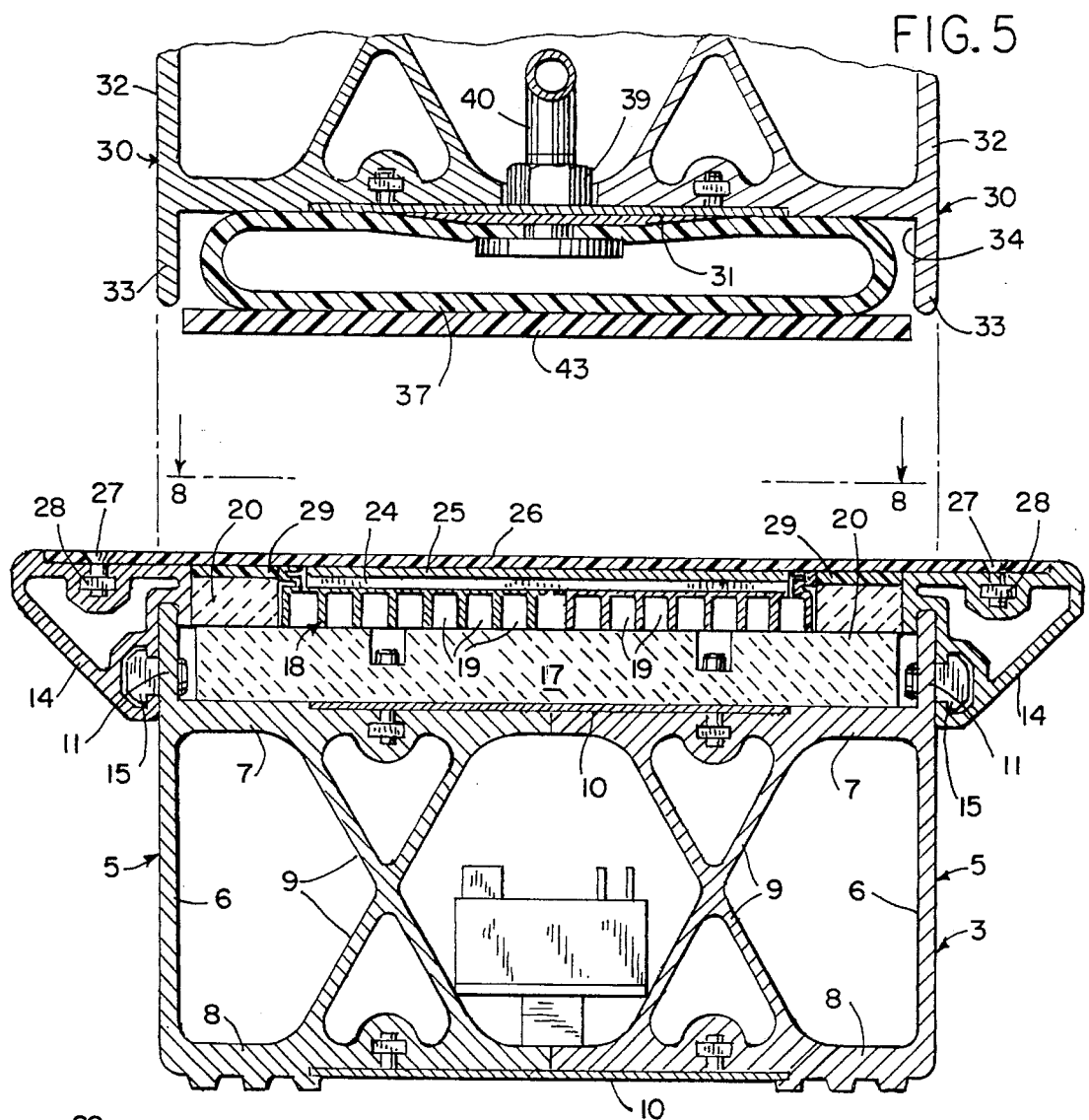
FIG. 5 is a section taken along line 5—5 of FIG. 3.

The press of the invention includes a lower platen 3, which supports the belt 1, and an upper platen 4. As best shown in FIG. 5, lower platen 3 is composed of a pair of side-by-side extrusions 5, preferably formed of aluminum. Each extrusion 5 includes a side wall 6, a top wall 7 and a bottom wall 8. Diagonal ribs 9 interconnect the top and bottom walls 7 and 8.

The two extrusions 5 are joined together in side-by-side relation by a pair of connecting plates 10, preferably formed of stainless steel. Plates 10 are connected to the top and bottom walls 7 and 8 by suitable bolts as illustrated in FIG. 5.

The upper edges of side walls 6 project beyond the top walls 7 to provide upwardly extending side flanges 11.

The ends of the connected extrusions 5 are enclosed by end plates 12 and 13.

As seen in FIG. 5, attached to the upper out-board edge of each extrusion 5 is an extruded extension 14, preferably formed of aluminum. The extensions 14 are connected to flanges 11 by bolts and captive nuts 15.

Suitable handles 16 are mounted on the side walls 6 to enable the lower platen to be conveniently lifted and maneuvered.

Located on the upper surfaces 7 of extrusions 5 between the side flanges 11 is a slab 17 of heat insulating material which can take the form of calcium silicate. Supported on the upper surface of insulating slab 17 is a block 18 of a material having a high coefficient of thermal conductivity, preferably formed of a metal such as aluminum. Block 18 is formed with a series of parallel open-bottom flow channels 19, as shown in FIGS. 5 and 7.

Figure 8:
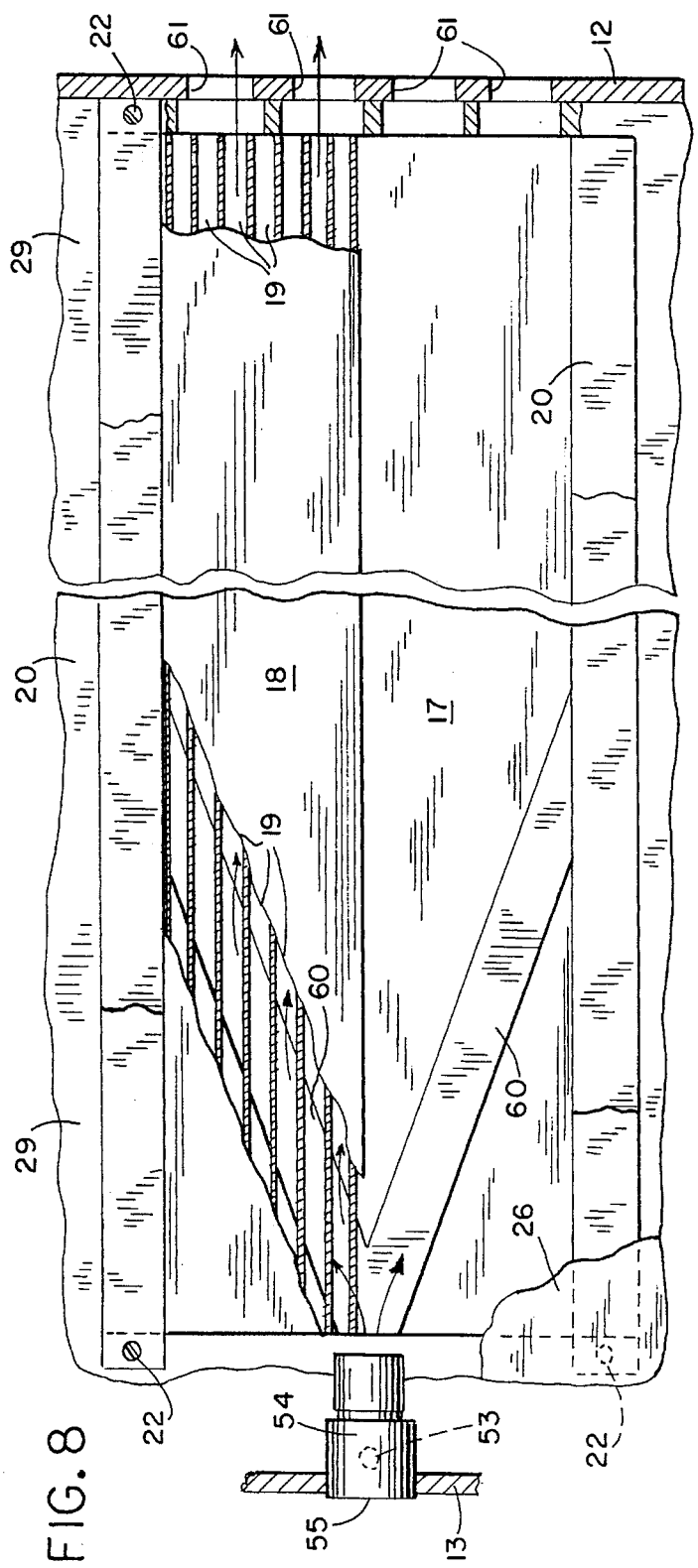
FIG. 8 is a section taken along line 8—8 of FIG. 5 showing the air supply groove in the insulating layer.

Insulating strips 20 of a material such as calcium silicate, are located laterally outward of the sides of the aluminum block 18, and the ends of the strips 20 are flush with the corresponding ends of the insulating layer 17, as best shown in FIG. 8. Posts 22 extend downwardly from the projecting ends of strips 29 and are located outwardly of the ends of the insulating slab 17 and strips 20, thus preventing longitudinal displacement of strips 29 relative to the slab 17.

Figure 7:
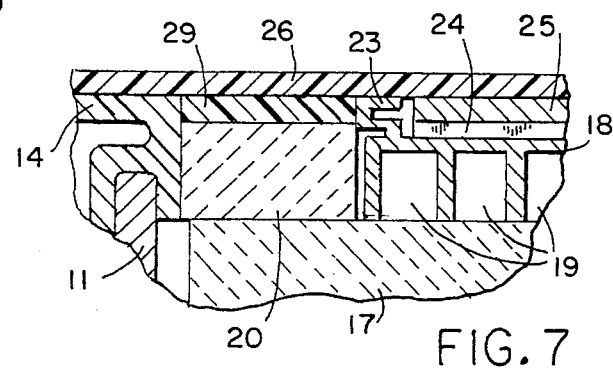
FIG. 7 is a fragmentary enlargement of a portion of the lower platen.

As shown in the enlarged view FIG. 7, each side edge 23 of the block 18 projects upwardly beyond the upper surface of the block and is provided with a generally S-shaped cross-section. The S-shaped cross-section 23 provides a substantially uniform wall thickness to prevent distortion during extrusion of the block 18, and provides a degree of resiliency when pressure is applied through the upper platen to compensate for tolerance variations in the heating element.

An electric heating element assembly 24 is mounted on the upper surface of the heat block or sink 18, between the projecting side edges 23. Heating element assembly 24 can be a conventional type, composed of a sheet of heat resistant material such as silicone rubber, with electrical resistant wires or foil embedded therein. As will be hereinafter described, the pattern of the heating wires or foil is varied throughout the surface area, so that greater wattage is applied to the peripheral edge portion of the heating element than to the central portion.

Located above the heating element 24 is a sheet 25 of metal, preferably aluminum, and the sheet 25 is covered by a layer 26 of a rigid heat resistant material which can take the form of a phenolic resin, containing silicone and glass fibers. The side edges of the layer 26 are attached to the extensions 14 through screws 27, which are engaged with nuts 28, located within recesses in the extension.

In addition, strips 29 of a heat resistant material similar to that of layer 26, are supported on the insulating strips 20, and are positioned between the sides of the block 18 and the corresponding extensions 14.

With this construction, the bottom and sides of the heat block or sink 18 are enclosed by the insulating layers 17, 20 and 29, thus containing the heat. Further, the aluminum can move block 18 relative to the insulating layers during the heating and cooling cycles.

Upper platen 4 is constructed in a manner similar to lower platen 3, and, as best shown in FIG. 5, includes a pair of side-by-side aluminum extrusions 30, similar to extrusions 5. The upper and lower surfaces of extrusions 30 are connected by plates 31. As seen in FIG. 5, the lower edges of the side walls 32 of extrusions 30 project beyond the lower surfaces of the extrusions to provide depending side flanges 33, that define a chamber or recess 34. The ends of the extrusions 30 are enclosed by end plates 35 and 36, similar to end plates 12 and 13.

Figure 1:
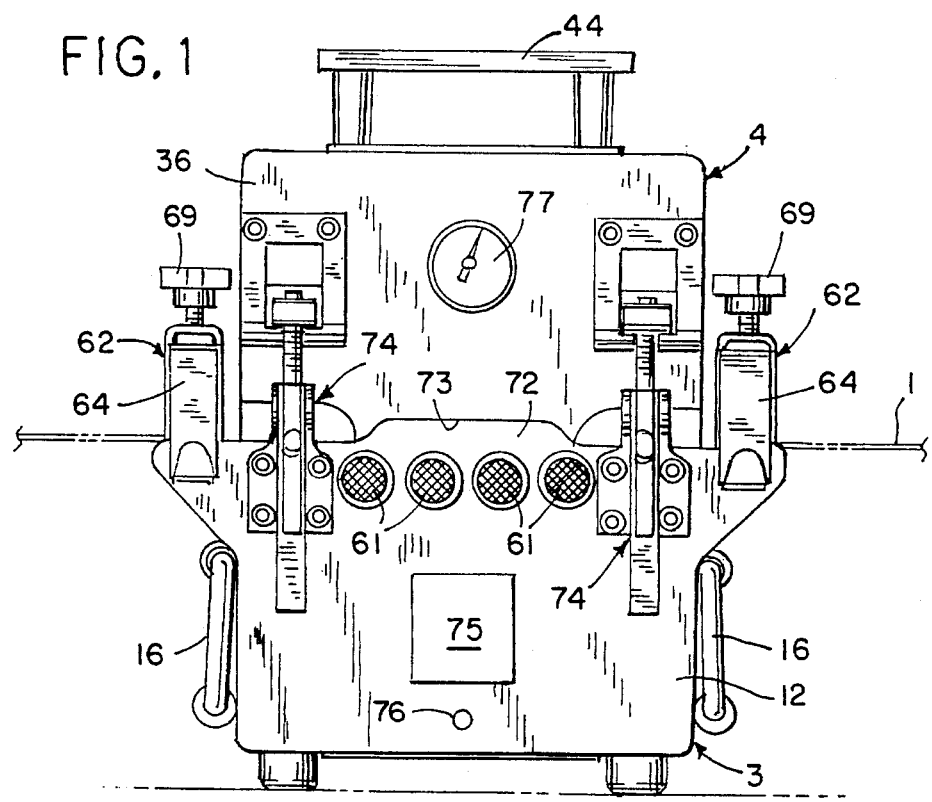
FIG. 1 is an end view of the heat press of the invention.
Figure 2:
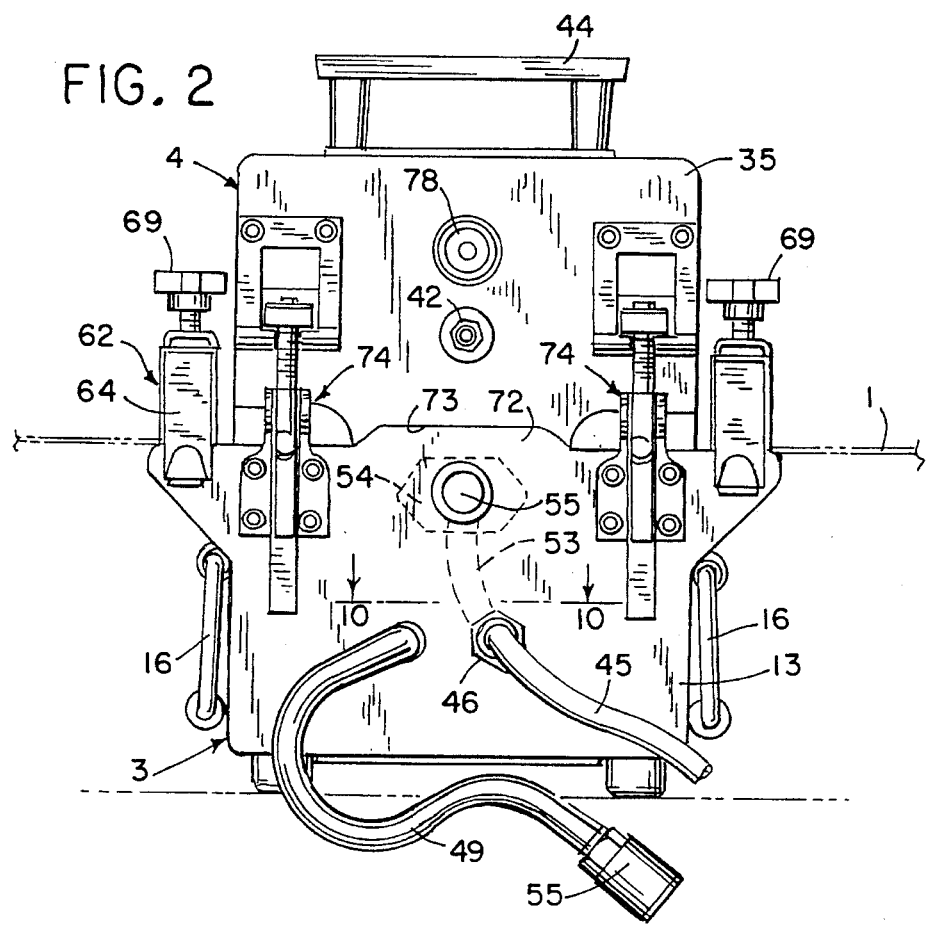
FIG. 2 is an end view of the opposite end of the heat press.
Figure 3:
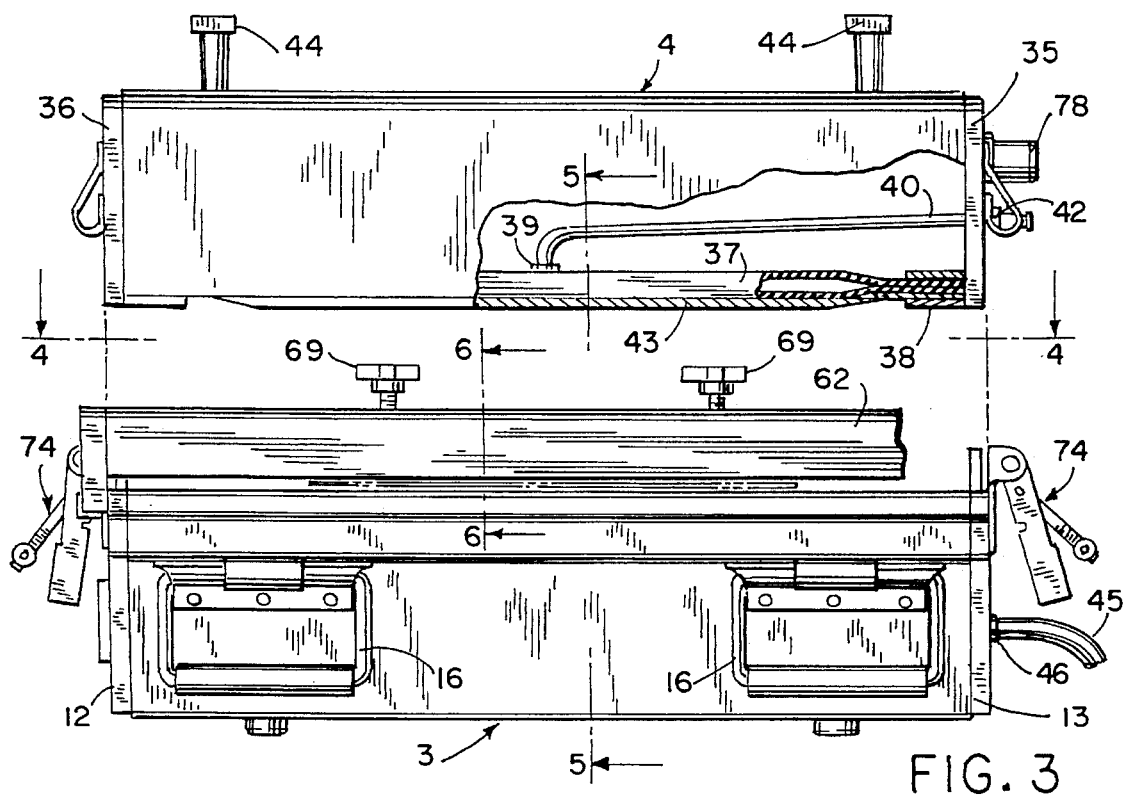
FIG. 3 is a side elevation of the press with parts broken away and the upper platen being shown in a raised position.

Located within chamber 34 is a flexible, inflatable bladder 37 formed of a material, such as firehose, that is capable of withstanding a substantial internal pressure. As shown in FIG. 3, the ends of the tubular bladder 37 are clamped together by end clamping strips 38 so that the bladder is completely enclosed. A fitting 39 is mounted centrally of bladder 37 and air line 40 connects the fitting 39 with a fitting 42 on the end plate 35.

To protect the bladder 37 from the high heat generated during the heating cycle, a layer 43 of heat resistant material, such as silicone rubber, can be applied to the lower surface of the bladder. Layer 43 is flexible and will flex with the inflation and deflation of the bladder.

A suitable handle 44 is mounted on the upper surface of the upper platen 4 to enable the upper platen to be readily lifted.

Figure 10:
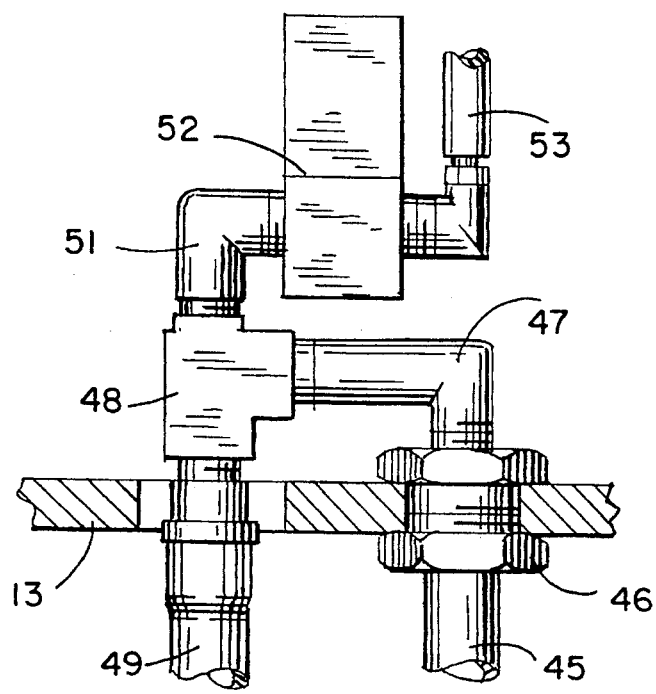
FIG. 10 is a section taken along line 10—10 of FIG. 2.
Figure 11:
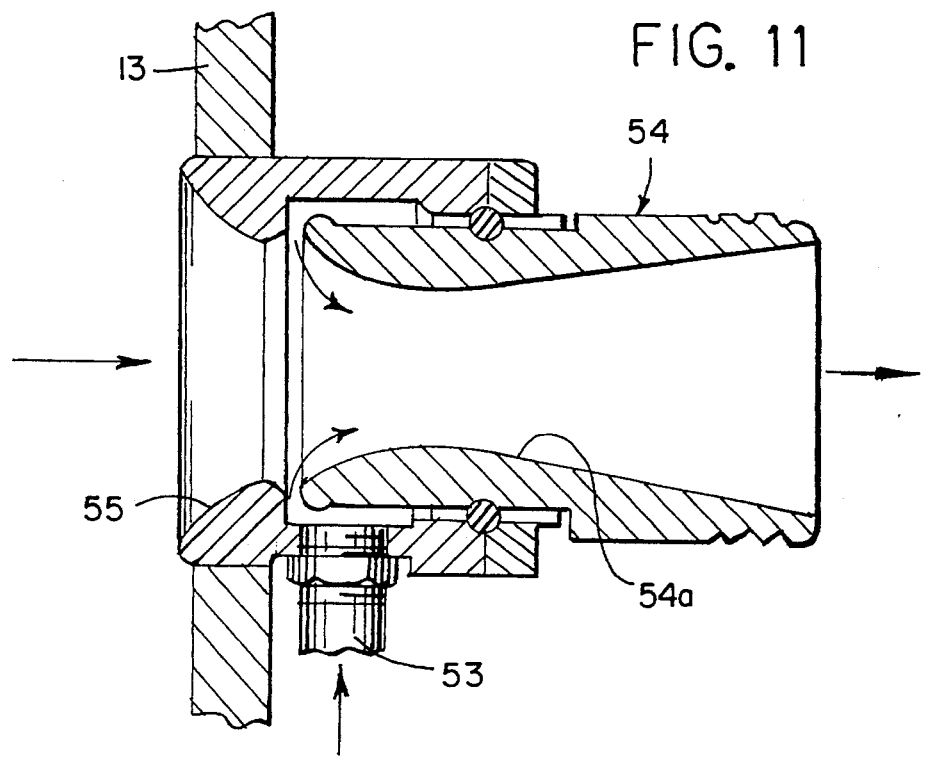
FIG. 11 is a longitudinal section of the venturi.

A common air supply system is utilized to inflate the bladder 37 as well as to cool the press after the splicing operation has been completed. In this regard, an air supply conduit 45, which is connected to a suitable source of compressed gas, such as air, is connected to a fitting 46 on end plate 13. An air line 47 located within lower plenum 3 connects fitting 46 with a T-fitting 48, as shown in FIG. 10. Hose 49 is attached to one arm of the T-fitting 48 and extends through end wall 13, while the opposite end of the hose 49 carries a coupling 50 that is adapted to be removably connected to the fitting 42 on the end plate 35 of the upper platen. With the hose 49 connected to the fitting 42 on the upper platen 4, compressed air can then be supplied through the hose to the bladder 37 to inflate the bladder.

The opposite arm of T-fitting 48 is connected to air line 51 and a valve 52 is mounted in the air line. A hose 53 connects the end of line 51 to a venturi 54, which is located within the lower platen 3.

Venturi 54 is a conventional type and is formed with a throat or restriction 54a of reduced cross-sectional area and an outside air inlet 55 in wall 13 communicates with the throat restriction. When valve 52 is opened, compressed air will flow into the venturi 54 through line 53 and into the restriction, thus creating an aspirating action to draw air from the atmosphere through the air inlet 55. The air, both compressed air and aspirated air, is discharged from the outlet in the venturi 54 into the flow channels 19 of block 18 to thereby provide a cooling action.

In order to uniformly distribute the air into the channels 19, the upper surface of the insulating slab 17 is provided with a pair of diagonal grooves 60 which are in a generally V-shaped configuration as best shown in FIG. 8. The apex of the V faces the outlet of the venturi 54, so that the air being discharged from the venturi will flow through the grooves 60. Grooves 60 communicate with the flow channels 19, and thus serve to distribute the air throughout the series of channels, thus providing a uniform distribution of air across the width of the block or heat sink 18.

The air, after passing through the channels 19, is discharged from the lower platen 3 through a series of screened vent holes 61 formed in the end plate 12. The cumulative cross-sectional area of vent holes 61 is substantially greater than the cross-sectional area of the venturi outlet, thus resulting in a substantial pressure drop in the air being discharged from the vent holes 61. This reduction in pressure not only reduces the noise generated by the exhausting air, but also eliminates any potential danger to personnel which could occur by exposure to high pressure compressed air.

The incorporation of the venturi 54 into the air cooling system results in a substantial portion of the cooling air being supplied from the atmosphere, thus reducing the amount of compressed air required for cooling.

Figure 6:
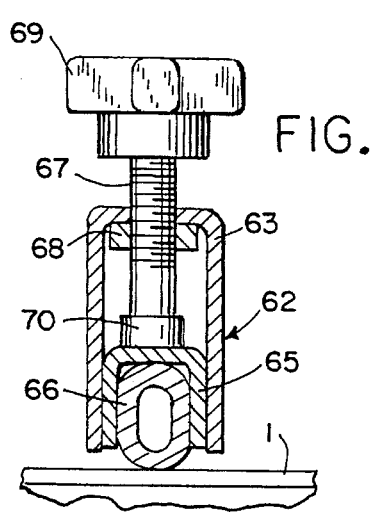
FIG. 6 is a transverse section of a side rail clamp.

In operation of the heat press, belt 1 is placed on the lower platen 3 with the interdigitated fingers 2 located generally centrally of the side walls 6 of the lower platen. A pair of clamping bars 62 are then attached to the lower platen to clamp the belt against the lower platen. Each clamping bar 62 includes an elongated channel-shaped housing 63 having an open lower surface, and end latches 64 are connected to the ends of housing 63 and project downwardly along end walls 12 and 13, thus locating the housing on the lower platen 3. A channel 65 preferably formed of an aluminum extrusion, is mounted within housing 63, as shown in FIG. 6.

Located within the channel 65 is a resilient tube 66, and the lower surface of the tube projects down-wardly beyond the channel 65, so that the tube 66 will engage the upper surface of belt 1.

After attachment of end latches 64, the tube 66 is forced downwardly against the belt by a plurality of screws 67. Each screw 67 is threaded in a nut 68 secured to the underside of the upper surface of housing 63, and the upper end of each screw carries a hand knob 69. The lower end of each screw 67 engages a block 70 which is secured to the upper surface of the channel 65. By threading down the screws 67, the channel 65 and tube 66 will be forced downwardly into tight bearing engagement with the belt 1.

Suitable shim strips 71, as seen in FIG. 4, can be positioned along each side edge of the belt 1 prior to turning down the clamping screws 67.

With the belt firmly clamped against the lower platen 3 by the clamping bars 62 and the fingers 2 properly interdigitated, the upper platen 4 is then positioned on the lower platen. The end plates 12 and 13 of the lower platen are each provided with a central upwardly projecting area 72 which is received within a mating recess 73 in the end plates 35 and 36 of the upper platen, thus serving to properly locate the upper platen relative to the lower platen. The upper platen is then secured to the lower platen through operation of toggle clamps 74, which are located at the ends of the press.

With the upper platen 4 properly mounted on the lower platen 3, air hose 49 can then be connected to fitting 42 on the upper platen 4.

The operator can then set the desired temperature to which the belt is to be heated on the temperature dial 75 on end plate 12. Air will be supplied from the source of compressed air through hose 45 to the lower platen 3 by plugging in to the external air supply, and the air will then flow through hose 49 to the bladder 37 in upper platen 4 to inflate the bladder and thereby force the belt 1 downwardly against the lower platen 3. Operation of the start button 76 will energize the heating element assembly 24 to thereby heat the portion of the belt between the platens to the selected temperature.

A pressure gauge 77 can be mounted in end wall 36 of upper platen 4 and is connected to bladder 37 to provide a visual indication of the bladder pressure. In addition, a suitable bladder pressure regulator 78 can be mounted in end wall 35 to control the bladder pressure.

Figure 9:
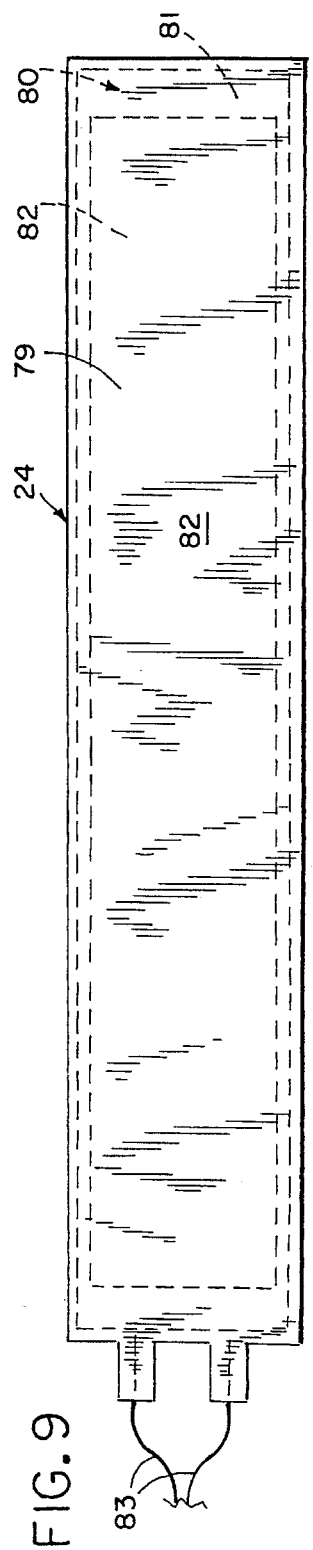
FIG. 9 is a plan view of the electrical heating element.

As previously noted, heating element assembly 24 is constructed to provide increased wattage to the peripheral edge portion of the element. As seen in FIG. 9, heating element 24 consists of a base or matrix 79 of a heat resistant material, such as silicone rubber, and an electrical resistance element 80, which can take the form of metal wire or foil, is embedded in base 79. Element 80 has a generally rectangular peripheral portion 81 having a greater wattage than the central portion 82. Suitable electrical leads 83 are connected to element 80. This construction directs a greater amount to the periphery of the splicing zone where heat will be more readily dissipated than from the central area.

When a predetermined temperature has been achieved as determined by a thermocouple in lower platen 3, the heating element 80 will be deenergized and a timed cooling cycle of generally about 10 minutes will then begin. With the cooling cycle, the valve 52 will open, enabling the compressed air to be supplied to the venturi 54. Through the aspirating operation of the venturi 54, air will also be drawn from the atmosphere and supplied to the flow channels 19 in the aluminum heat sink 18.

As previously noted, the air being discharged from the channels 19 will exit through the vent holes 61.

The flow channels 19 in the heat sink 18 provide an effective flow path for the cooling air as well as minimizing the mass and weight of the heat sink. Due to the lesser mass, plus the insulating effect achieved by the insulating layers 17 and 20, the heat is contained within the press resulting in minimal heat loss and thus requiring less power to achieve the desired fusing temperature.

The press is light in weight and is portable, which enables the press to be conveniently moved by a single operator to a conveyor, so that a belt can be spliced directly on the conveyor.

The splicing operation is automated so that no operator is required in attendance during the entire cycle.

Various modes of carrying out the invention are contemplated as being within the scope of the following claims particularly pointing out and distinctly claiming the subject matter which is regarded as the invention.

I claim:

1. A heat press for joining the spliced ends of a conveyor belt, comprising a first platen having a first surface, an inflatable bladder disposed on said first surface, first fluid supply means connected to the bladder for supplying a fluid to the bladder to inflate the bladder, a second platen having a second surface facing said first surface, a layer of solid insulating material disposed on said second surface, a block of material having a high coefficient of thermal conductivity disposed on said insulating layer and including a plurality of generally parallel internal flow channels, electric heating means supported by said block for heating said belt, said insulating layer having a face facing said block, said face having at least one groove extending diagonally from an end of said layer toward a side edge of said layer, said groove communicating with said channels, air supply means including a source of air under pressure and an air supply conduit connecting said source with a portion of the groove located at said end of said layer, whereby air is supplied to said groove and then to the channels.

2. The press of claim 1, and including a pair of said grooves in said layer, said grooves being disposed in a generally V-configuration with said grooves meeting at an apex located adjacent said end of said layer.

3. The press of claim 1, and including a plurality of air outlets in said second platen and communication with said channels for discharging air from said second platen.

4. The press of claim 3, wherein the combined cross-sectional area of said outlets is greater than the cross-sectional area of said air supply conduit.

5. The press of claim 1, and including venturi means located in said air supply conduit for drawing air from the atmosphere into said air supply conduit as said air flows through said venturi.

6. The press of claim 5, wherein said venturi means includes a zone of restricted cross-sectional area, and a second conduit communicating with the atmosphere and connected to said zone.

7. A heat press for joining the spliced ends of a conveyor belt, comprising a first platen having a first pressure plate disposed to engage a first surface of the belt, a second platen having a second pressure plate disposed to engage a second surface of said belt, said second platen also including a layer of solid insulating material and a block of material having a high coefficient of thermal conductivity disposed between said second pressure plate and said insulating layer, said block including a first face having a plurality of flow channels disposed to conduct a cooling medium, said layer having a second face disposed in contiguous relation with said first face and having at least one groove communicating with said channels and disposed at an acute angle with respect to said channels, air supply means including a source of pressurized air and an air supply conduit connecting said source with said groove whereby air is supplied to said groove and then to said channels, and heating means associated with said block for heating said belt.

8. The heat press of claim 7, and including venturi means disposed in said air supply conduit and communicating with the atmosphere for drawing air into said air supply conduit from the atmosphere as said pressurized air flows through said venturi means.

\* \* \* \* \*